No. 610,744. Patented Sept. 13, 1898.
W. B. HENION.
VALVE SEAT.
(Application filed Dec. 28, 1897.)
(No Model.)
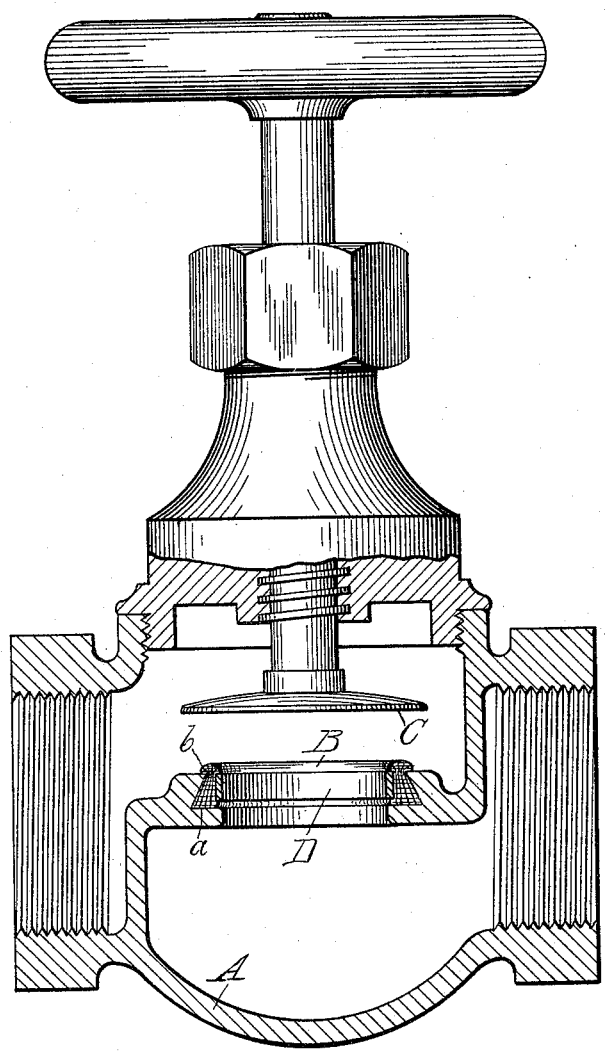
Witnesses:
Inventor:
W. B. HENION.

UNITED STATES PATENT OFFICE.

WAKEMAN B. HENION, OF CHICAGO, ILLINOIS.

VALVE-SEAT.

SPECIFICATION forming part of Letters Patent No. 610,744, dated September 13, 1898.

Application filed December 28, 1897. Serial No. 664,082. (No model.)

*To all whom it may concern:*

Be it known that I, WAKEMAN B. HENION, of Chicago, in the county of Cook and State of Illinois, have invented certain new and useful Improvements in Valve-Seats, of which the following is a specification.

This invention relates to improvements in valve-seats, and contemplates, more particularly, the securing of an elastic or fibrous seat, such as rubber or the like, within the metal casing of valves in an improved manner both strong and permanent and at the same time simple and inexpensive.

The invention consists in the matters herein set forth, and particularly pointed out in the appended claim, and which will be fully understood when considered in connection with the accompanying drawing, in which the figure is a sectional side elevation of an ordinary globe-valve provided with a rubber or similar seat in accordance with my improvements.

In said drawing, A designates the valve-casing, which in this instance is that of an ordinary globe-valve, although it will be understood the invention is equally applicable to valves of any other type.

B designates the annular valve-seat, and C the valve plate or disk, which is brought into contact with said seat to close the valve.

It is a practical necessity that the manner of securing the seat B in the metallic casing of the valve shall afford a strong and secure fastening, such that said seat cannot become loosened or be torn away from the surrounding casing by any usage to which it is liable to be subjected—as, for example, by adhesion to the valve-plate C when the latter has been closed down tightly upon the seat and is allowed to remain closed a considerable period. To this end said seat is inserted within an annular recess, herein shown as widening toward its bottom, so that it presents an overhanging outer wall. The seat is compressed into this recess by the application of a metal ring D, which is inserted in the seat B and then permanently expanded by the application of a suitable tool or expander, so that it compresses the seat outwardly into the annular recess $a$ and locks it securely and permanently in said recess. The body of the ring will in this manner be sunk into the yielding body of the seat B, and the exposed portion $b$ of the latter, which projects above the surrounding casing and above the ring B' and which is not subject to compression, will afford an ample seat for the plate C.

The construction described is extremely simple, inexpensive, and efficient. It locks the yielding seat tightly and permanently in place without requiring a bolted or screw connection or other mechanical locking device and at the same time is sufficiently positive in its action to entirely preclude the possibility of the seat being torn out or becoming loosened in use. The seat and expanded ring may be cut out at any time when the seat has become too greatly worn and may then be replaced by a new seat applied in the same manner by permanently expanding a metal ring within it.

I claim as my invention—

The combination with a valve-casing having an undercut annular recess $a$, of an elastic annular seat B occupying said undercut recess, and an expanded metal ring D, embedded within said elastic seat and holding the same compressed within the recess.

In testimony that I claim the foregoing as my invention I affix my signature in presence of two subscribing witnesses.

WAKEMAN B. HENION.

Witnesses:
  E. E. JOHNSON,
  H. A. YOUNG.